(12) United States Patent
Okamoto et al.

(10) Patent No.: US 8,159,165 B2
(45) Date of Patent: Apr. 17, 2012

(54) MOTOR DRIVE CIRCUIT

(75) Inventors: Isao Okamoto, Kariya (JP); Hiroyuki Matsumori, Kariya (JP)

(73) Assignee: Advics Co., Ltd, Aichi-Pref. (JP)

( * ) Notice: Subject to any disclaimer, the term of this patent is extended or adjusted under 35 U.S.C. 154(b) by 504 days.

(21) Appl. No.: 12/475,168

(22) Filed: May 29, 2009

(65) Prior Publication Data

US 2009/0295321 A1    Dec. 3, 2009

(30) Foreign Application Priority Data

May 30, 2008   (JP) .................................. 2008-142383

(51) Int. Cl.
*H02H 7/08* (2006.01)

(52) U.S. Cl. ............... 318/400.21; 318/434; 318/139; 361/23; 361/1; 361/78; 361/82; 320/DIG. 15

(58) Field of Classification Search ............. 318/434, 318/432, 139, 400.21; 307/125, 140; 361/1, 361/23, 78, 82; 320/DIG. 15
See application file for complete search history.

(56) References Cited

U.S. PATENT DOCUMENTS

| | | | | |
|---|---|---|---|---|
| 5,508,906 A | * | 4/1996 | Nelli et al. ...................... | 363/97 |
| 5,519,557 A | * | 5/1996 | Kopera et al. .................... | 361/84 |
| 5,847,911 A | * | 12/1998 | Van Reenen et al. ............ | 361/84 |
| 6,321,031 B1 | * | 11/2001 | Mohr et al. ...................... | 388/801 |
| 6,687,102 B2 | * | 2/2004 | Lopez et al. ..................... | 361/84 |
| 6,756,752 B2 | * | 6/2004 | Wolfel ............................. | 318/139 |
| 6,963,183 B1 | | 11/2005 | Kessler et al. | |
| 7,119,999 B2 | * | 10/2006 | Baldwin et al. ................. | 361/84 |
| 7,268,508 B2 | * | 9/2007 | Caillaud et al. ................. | 318/379 |
| 7,433,171 B2 | * | 10/2008 | Vincent et al. .................. | 361/159 |
| 7,561,404 B2 | * | 7/2009 | Sells ................................ | 361/246 |
| 7,589,490 B2 | * | 9/2009 | Haesters et al. ................ | 318/811 |
| 7,881,035 B2 | * | 2/2011 | Takahashi et al. .............. | 361/152 |

FOREIGN PATENT DOCUMENTS

JP    2001-511636 A    8/2001

* cited by examiner

*Primary Examiner* — Rita Leykin
(74) *Attorney, Agent, or Firm* — Sughrue Mion, PLLC

(57) ABSTRACT

A first semiconductor switching element connects to a high side of a motor and includes a diode whose cathode faces the high side. A second semiconductor switching element having a diode resides on a low side of the first semiconductor switching element. A third semiconductor switching element having a diode resides on a low side of the motor. A fourth semiconductor switching element is connected in parallel to the motor and configures a return current circuit that includes a return current element and causes a return current that arises when the first semiconductor switching element turns off to flow through the return current element. A control portion controls on-off states of the first to the fourth semiconductor switching elements and performs return current circuit failure detection based on a first monitor voltage that is an electric potential of a connecting point between the first semiconductor switching element and the motor.

5 Claims, 9 Drawing Sheets

| | DRIVE OUTPUT | | | | VOLTAGE MONITOR | | | | | MOTOR OPERATION |
|---|---|---|---|---|---|---|---|---|---|---|
| | Tr1 | Tr2 | Tr3 | Tr4 | WHEN NORMAL | Tr1 DISCONNECTED | Tr2 DISCONNECTED | Tr3 DISCONNECTED | Tr4 DISCONNECTED | |
| FIRST CHECK | OFF | OFF | OFF | OFF | M | M | M | M | M | NO |
| SECOND CHECK | ON | OFF | OFF | OFF | Hi | M | Hi | Hi | Hi | NO |
| THIRD CHECK | OFF | ON | OFF | ON | Lo | Lo | M | Lo | M | NO |
| FOURTH CHECK | OFF | ON | ON | OFF | Lo | Lo | M | M | Lo | NO |

FIG. 2

|  | DRIVE OUTPUT | | | | VOLTAGE MONITOR | | | | | MOTOR OPERATION |
| --- | --- | --- | --- | --- | --- | --- | --- | --- | --- | --- |
|  | Tr1 | Tr2 | Tr3 | Tr4 | WHEN NORMAL | Tr1 DISCONNECTED | Tr2 DISCONNECTED | Tr3 DISCONNECTED | Tr4 DISCONNECTED | |
| FIRST CHECK | OFF | OFF | OFF | OFF | M | M | M | M | M | NO |
| SECOND CHECK | ON | OFF | OFF | OFF | Hi | M | Hi | Hi | Hi | NO |
| THIRD CHECK | OFF | ON | OFF | ON | Lo | Lo | M | Lo | M | NO |
| FOURTH CHECK | OFF | OFF | ON | OFF | Lo | Lo | Lo | M | Lo | NO |

FIG. 4

| DRIVE OUTPUT | | | | VOLTAGE MONITOR | | | | | | | | | | MOTOR OPERATION |
|---|---|---|---|---|---|---|---|---|---|---|---|---|---|---|
| | | | | WHEN NORMAL | | Tr1 DISCONNECTED | | Tr2 DISCONNECTED | | Tr3 DISCONNECTED | | Tr4 DISCONNECTED | | |
| Tr1 | Tr2 | Tr3 | Tr4 | FIRST MONITOR | SECOND MONITOR | FIRST MONITOR | SECOND MONITOR | FIRST MONITOR | SECOND MONITOR | FIRST MONITOR | SECOND MONITOR | FIRST MONITOR | SECOND MONITOR | |
| FIRST CHECK | OFF | OFF | OFF | OFF | M1 | Lo | M1 | Lo | M1 | Lo | M1 | Lo | M1 | Lo | NO |
| SECOND CHECK | ON | OFF | OFF | OFF | Hi | Lo | M1 | Lo | Hi | Lo | Hi | Lo | Hi | Lo | NO |
| THIRD CHECK | OFF | OFF | OFF | ON | M2 | M2 | M2 | M2 | M2 | M2 | M2 | M2 | M1 | Lo | NO |
| FOURTH CHECK | OFF | ON | OFF | OFF | M3 | M3 | M3 | M3 | M1 | Lo | M3 | M3 | M3 | M3 | NO |
| FIFTH CHECK | OFF | OFF | ON | OFF | Lo | Lo | Lo | Lo | Lo | Lo | M1 | Lo | Lo | Lo | NO |

FIG. 6

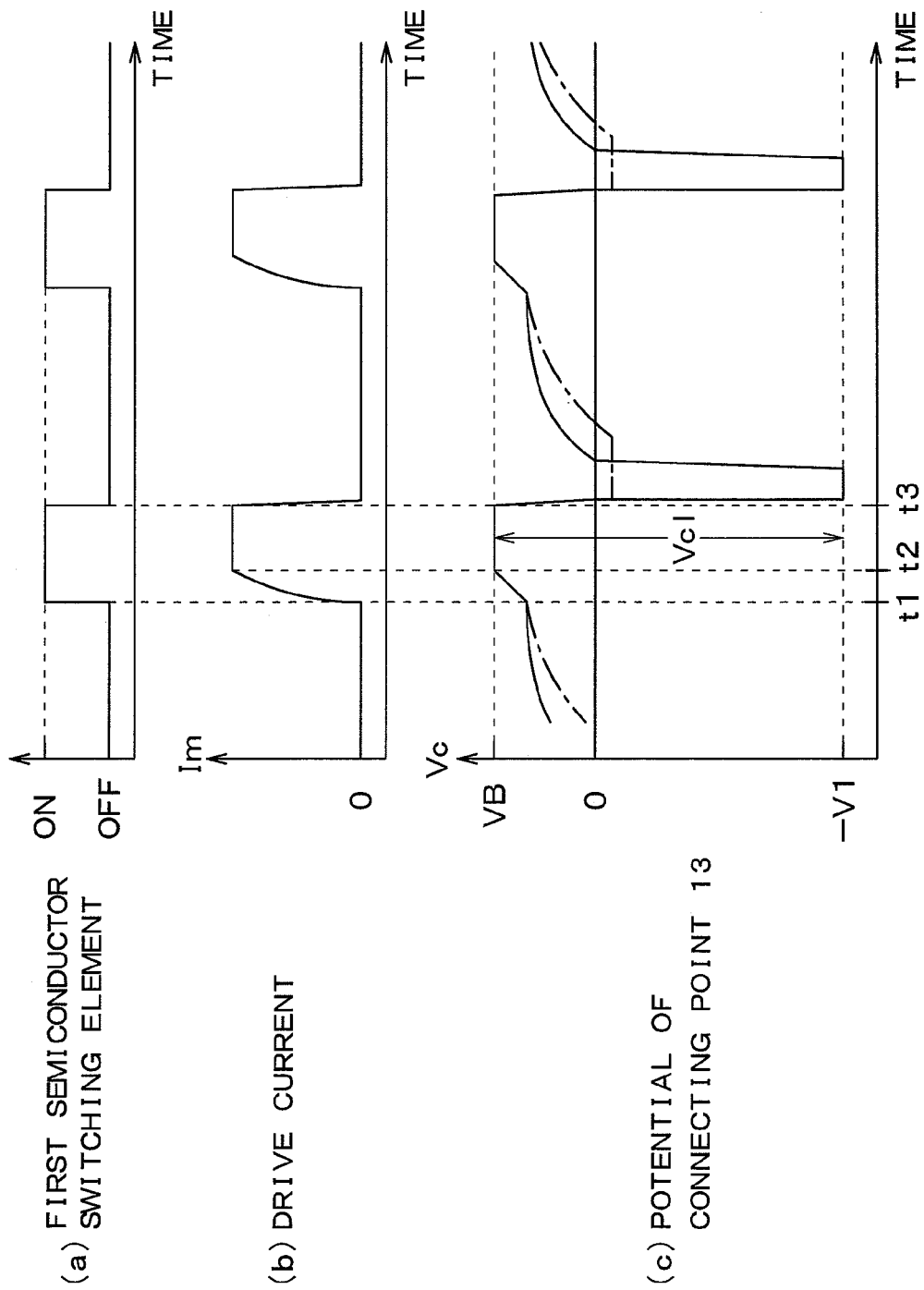

MOTOR DRIVE CIRCUIT

CROSS REFERENCE TO RELATED APPLICATION

This application is based upon and claims the benefit of Japanese Patent Application No. 2008-142383 filed on May 30, 2008, the content of which are incorporated herein by reference.

BACKGROUND OF THE INVENTION

1. Field of the Invention

The present invention relates to a motor drive circuit that is provided with a failure detection function in a circuit in which a return current element is connected in parallel to a motor.

2. Description of the Related Art

A known motor drive circuit is disclosed in Japanese Patent Application Publication No. JP-A-2001-511636 in which a freewheeling diode that serves as a return current element is connected in parallel to both terminals of a motor that is provided for a brake fluid pressure control actuator or the like. In this sort of motor drive circuit, in a case where the motor is driven by PWM, when a surge is generated by a back electromotive force that is generated when the PWM drive is off, the surge can be directed through a return current circuit through the freewheeling diode that is connected in parallel to the motor, making it possible to suppress the surge.

Furthermore, in the motor drive circuit with this sort of structure, in a case where a battery is connected in reverse, the freewheeling diode is connected in the forward direction, making it possible for a short-circuit current to flow. A diode for protecting the freewheeling diode against a reverse connection is therefore connected in series to prevent the short-circuit current when the battery is connected in reverse.

In the known motor drive circuit described above, an initial check for a failure location is performed. The initial check may be conducted, for example, by turning on and off a semiconductor switching element that controls an electric current supply to the motor.

However, it is not possible for an initial check described above to check for a fault in which the freewheeling diode is open (short-circuited), so it is not possible to detect a failure in the return current circuit that is due to the freewheeling diode. Therefore, in the worst case, the back electromotive force that is generated when the motor is turned off will destroy the semiconductor switching element.

SUMMARY OF THE INVENTION

The present invention addresses these issues and provides a motor drive circuit that can perform failure detection for the return current circuit.

In order to address these issues, in the present invention, according to a first aspect, a first semiconductor switching element for use in motor control is connected in series to a high side of a motor and includes a diode whose cathode faces toward the high side. A second semiconductor switching element is located on a low side of the first semiconductor switching element and includes a diode whose anode faces toward the high side. Furthermore, a third semiconductor switching element for use as a fail-safe element is located on a low side of the motor and includes a diode whose cathode faces toward the high side. A fourth semiconductor switching element is connected in parallel to the motor and configures a return current circuit that includes a return current element and that causes a return current that is generated when the first semiconductor switching element is turned off to flow through the return current element. In addition, a control portion controls on and off states of the first to the fourth semiconductor switching elements, uses an electric potential of a connecting point between the first semiconductor switching element and the motor as a first monitor voltage, inputs a voltage that corresponds to the first monitor voltage, and that performs failure detection, based on the first monitor voltage, that checks whether the return current circuit is functioning properly or not.

According to this sort of motor drive circuit, it is possible to check whether the return current element is properly connected electrically, based on the on and off states of the fourth semiconductor switching element. It is thus possible to perform failure detection for the return current circuit.

For example, as described in a second aspect, the circuit can be configured such that the second semiconductor switching element is located on a low side of the third semiconductor switching element.

Further, as described in a third aspect, the circuit can be configured such that the fourth semiconductor switching element is connected in parallel to the third semiconductor switching element and the motor, which are connected in series.

In this case, as described in a fourth aspect, for example, the circuit can be configured such that the motor and the third semiconductor switching element, which are connected in series, are connected in parallel to the second semiconductor switching element and the fourth semiconductor switching element, which are connected in series.

In a case where the circuit is configured in this manner, only the return current flows to the second semiconductor switching element, and the electric current that flows to the motor when the electric power is being supplied ceases to flow, so it is possible to make the second semiconductor switching element more compact and to reduce its cost.

Furthermore, as described in a fifth aspect, the first semiconductor switching element, the fourth semiconductor switching element, the second semiconductor switching element, and the third semiconductor switching element can be connected in series in that order, starting from the high side, an electric potential of a connecting point between the fourth semiconductor switching element and the second semiconductor switching element can be used as a second monitor voltage, a voltage that corresponds to the second monitor voltage can be input to the control portion, and the control portion can perform failure detection, based on the first monitor voltage and the second monitor voltage, that checks whether the return current circuit is functioning properly or not.

BRIEF DESCRIPTION OF THE DRAWINGS

FIG. 2 is a table that shows a table of truth values that indicate on and off states of MOSFETs, relationships between a monitor voltage and a voltage during a failure, and a drive state of a motor, which correspond to various types of items that are checked during failure detection;

FIG. 4 is a table that shows a table of truth values that indicate the on and off states of the MOSFETs, the relationships between the monitor voltage and the voltage during a failure, and the drive state of the motor, which correspond to various types of items that are checked during the failure detection;

FIG. 6 is a table that shows a table of truth values that indicate the on and off states of the MOSFETs, relationships between first and second monitor voltages and the voltage during a failure, and the drive state of the motor, which correspond to various types of items that are checked during the failure detection;

FIG. 7 is a figure that shows a mode of operation of the motor drive circuit;

DETAILED DESCRIPTION OF THE PREFERRED EMBODIMENTS

Figure 1:
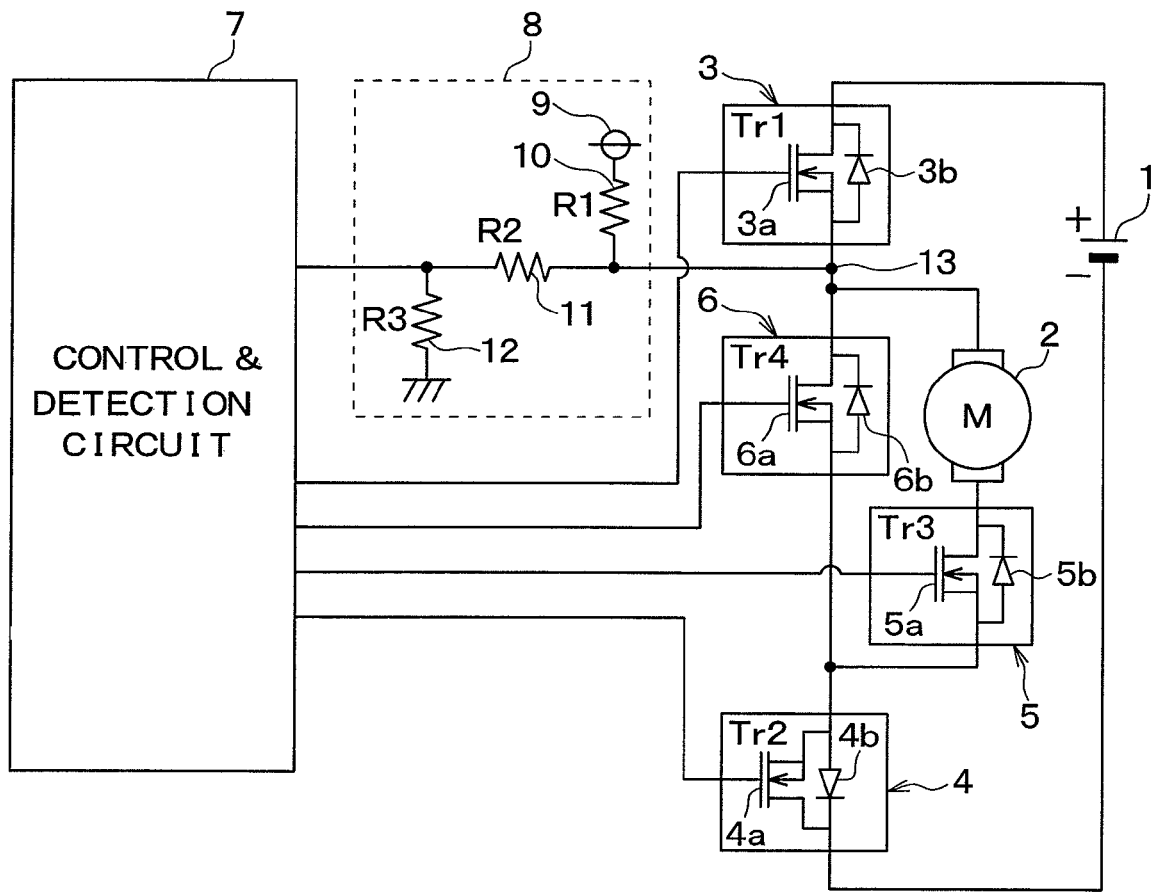
FIG. 1 is a figure that shows a circuit configuration of a motor drive circuit according to a first embodiment of the present invention.

Hereinafter, embodiments of the present invention will be explained based on the drawings. Note that structural elements that are one of identical and equivalent among all of the embodiments hereinafter described are denoted with the same reference numerals in the drawings.

First Embodiment

A first embodiment of the present invention will be explained. In the present embodiment, a case will be explained in which the first embodiment of the present invention is used for a motor drive circuit for driving a motor that is provided with a brake fluid pressure control actuator or the like.

FIG. 1 is a figure that shows a circuit configuration of the motor drive circuit according to the present embodiment. As shown in this figure, a battery 1 serves as a power source, and the motor drive circuit performs driving of a motor 2 based on a supply of electric power from the battery 1.

The motor drive circuit is provided with first to fourth semiconductor switching elements 3 to 6 and a control and detection circuit 7 that serves as a control portion for controlling the first to the fourth semiconductor switching elements 3 to 6.

The first semiconductor switching element 3 is connected in series to the motor 2 on the upstream side of the motor 2. The first semiconductor switching element 3 is configured such that it includes a MOSFET 3a and a parasitic diode 3b that is formed within the MOSFET 3a. In a case where the MOSFET 3a is an N-channel (the opposite of a case where it is a P-channel), for example, the drain terminal is connected to the high side (the side of the positive terminal of the battery 1), and the source terminal is connected to the low side (the side of the motor 2). The parasitic diode 3b is therefore in a state in which the cathode faces toward the high side. The first semiconductor switching element 3 functions as a motor control element for controlling whether the power supply to the motor 2 is on or off.

The second semiconductor switching element 4 is provided downstream from the motor 2. The second semiconductor switching element 4 is configured such that it includes a MOSFET 4a and a parasitic diode 4b that is formed within the MOSFET 4a. In a case where the MOSFET 4a is an N-channel (the opposite of a case where it is a P-channel), for example, the source terminal is connected to the high side (the side of the motor 2), and the drain terminal is connected to the low side (the side of the third semiconductor switching element 5 described below). The parasitic diode 4b is therefore in a state in which the anode faces toward the high side. The second semiconductor switching element 4 functions as a protective element for preventing a short-circuit current from flowing due to the MOSFET 4a being turned off when the battery 1 is connected in reverse.

The third semiconductor switching element 5 is connected in series to the first semiconductor switching element 3 and the motor 2 on the downstream side of the first semiconductor switching element 3. The third semiconductor switching element 5 is configured such that it includes a MOSFET 5a and a parasitic diode 5b that is formed within the MOSFET 5a. In a case where the MOSFET 5a is an N-channel (the opposite of a case where it is a P-channel), for example, the drain terminal is connected to the high side (the side of the first semiconductor switching element 3), and the source terminal is connected to the low side (the side of the negative terminal of the battery 1). The parasitic diode 5b is therefore in a state in which the cathode faces toward the high side. The third semiconductor switching element 5 functions as a fail-safe element that, when a failure occurs in the first semiconductor switching element 3, such as when a short circuit occurs and the power supply to the motor 2 cannot be cut off, for example, substitutes for the first semiconductor switching element 3 and cuts off the power supply to the motor 2.

The fourth semiconductor switching element 6 is connected in parallel to the motor 2 on the downstream side of the first semiconductor switching element 3. The fourth semiconductor switching element 6 is configured such that it includes a MOSFET 6a and a parasitic diode 6b that is formed within the MOSFET 6a. In a case where the MOSFET 6a is an N-channel (the opposite of a case where it is a P-channel), for example, the drain terminal is connected to the high side (the side of the first semiconductor switching element 3), and the source terminal is connected to the low side (the side of the third semiconductor switching element 5). The parasitic diode 6b is therefore in a state in which the cathode faces toward the high side. The parasitic diode 6b of the fourth semiconductor switching element 6 functions as a return current element (a freewheeling diode).

Because the MOSFETs 3a to 6a of the first to the fourth semiconductor switching elements 3 to 6 are controlled by the control and detection circuit 7, not only control of the power supply to the motor 2 is performed, but failure detection that determines whether each of the semiconductor switching elements 3 to 6 is operating properly is also performed.

In particular, the motor drive circuit is also provided with a monitor circuit (a first monitor circuit) 8 that monitors a motor voltage that is applied to the motor 2. The monitor circuit 8 is configured such that it includes, for example, a constant-voltage source 9 that is a power source of five volts or the like, as well as first to third resistors 10 to 12 that have resistance values that are much greater than the resistance of the motor 2. By taking the potential at a connecting point 13, where the first semiconductor switching element 3 and the fourth semiconductor switching element 6 are connected, using the second resistor 11 and the third resistor 12 to divide the potential, and inputting the divided voltage to the control and detection circuit 7, the monitor circuit 8 monitors the motor voltage and also inputs to the control and detection circuit 7 a voltage (hereinafter called the monitor voltage) that is divided by the first to the third resistors 10 to 12 according to the on-off states of the MOSFETs 3a to 6a of the first to the fourth semiconductor switching elements 3 to 6. This causes the failure detection for each of the semiconductor switching elements 3 to 6 to be performed by the control and detection circuit 7.

Methods by which the motor drive circuit that is configured as described above drives the motor 2 and detects a failure are explained below.

First, in a case where the motor 2 is driven by PWM, during normal operation, in a state in which the MOSFET 4a of the second semiconductor switching element 4 and the MOSFET 5a of the third semiconductor switching element 5 are always on and the MOSFET 6a of the fourth semiconductor switching element 6 is always off, the MOSFET 3a of the first semiconductor switching element 3 performs PWM control. This means that when the MOSFET 3a of the first semiconductor switching element 3 is on, the path by which current flows from the first semiconductor switching element 3 to the second semiconductor switching element 4 through the fourth semiconductor switching element 6 is cut off by the MOSFET 6a and the parasitic diode 6b, such that the motor 2 is energized. Further, when the MOSFET 3a of the first semiconductor switching element 3 is off, a back electromotive force is generated, but the parasitic diode 6b of the fourth semiconductor switching element 6 acts as the freewheeling diode, and the return current flows in a return current circuit from the motor 2 through the MOSFET 5a and the parasitic diode 6b. This makes it possible to suppress a surge that is generated when the PWM control is off.

Next, during the failure detection, the turning on and off of the MOSFETs 3a to 6a of the first to the fourth semiconductor switching elements 3 to 6 is controlled as described below, and the failure detection for each portion is performed without driving the motor 2, based on a monitor potential that is input to the control and detection circuit 7 from the monitor circuit 8 at this time. This will be explained with reference to a table that is shown in FIG. 2.

FIG. 2 is a table that shows a table of truth values that indicate the on and off states of the MOSFETs 3a to 6a in the first to the fourth semiconductor switching elements 3 to 6, relationships between the monitor voltage and a voltage during a failure, and the drive state of the motor 2, which correspond to various types of items that are checked during the failure detection.

First, as a first check, each element is checked to see if it is locked on. The expression "locked on" means that one of the MOSFETs 3a to 6a is locked in an on state.

In this case, the MOSFETs 3a to 6a are all turned off, and the level of the monitor voltage is checked. At this time, the MOSFETs 3a to 6a are all turned off, so the power supply line from the battery 1 to the motor 2 is cut off, and the motor 2 is not being driven.

In concrete terms, if a locked on state has not occurred, the divided voltage that results when the first to the third resistors 10 to 12 divide the voltage of the constant-voltage source 9, that is, a medium voltage (hereinafter called the M level), becomes the monitor voltage. In contrast to this, in a case where the MOSFET 3a of the first semiconductor switching element 3 is locked on, the divided voltage that results when the second and third resistors 11, 12 divide the voltage on the positive terminal side of the battery 1, that is, a Hi level voltage, becomes the monitor voltage. Further, in a case where the MOSFETs 5a, 6a of the third and fourth semiconductor switching elements 5, 6 are locked on, the voltage on the negative side of the battery 1 is drawn, so a Lo level voltage becomes the monitor voltage. Therefore, if the monitor voltage becomes other than the M level voltage, that is, one of the Hi level voltage and the Lo level voltage, the control and detection circuit 7 detects that a locked on state has occurred.

Note that in a case where a locked on state has not occurred, if any one of the first to the fourth semiconductor switching elements 3 to 6 is disconnected, a state comes into being that is the same as when all of the MOSFETs 3a to 6a are off, so no matter which one of the first to the fourth semiconductor switching elements 3 to 6 is disconnected, the monitor voltage becomes the M level voltage.

Next, a second check is performed to detect a failure in the path from the positive terminal side of the battery 1, through the first semiconductor switching element 3, to the connecting point 13.

In this case, the MOSFET 3a of the first semiconductor switching element 3 is turned on, and the other MOSFETs 4a to 6a are turned off. Also at this time, because the MOSFETs 4a to 6a are turned off, the power supply line from the battery 1 to the motor 2 is in a cut off state, so the motor 2 is not being driven. If everything is normal, the monitor voltage will become the Hi level voltage, but if a disconnection has occurred in the path described above, such as a disconnection of the MOSFET 3a or the like, the monitor voltage will remain at the M level voltage. Further, in a case where one of the MOSFETs 5a, 6a of the third and the fourth semiconductor switching elements 5, 6 is locked on, the monitor voltage will become the Lo level voltage instead of the M level voltage. Therefore, this operation makes it possible to check that the path described above is functioning normally, with the MOSFET 3a on and the MOSFETs 5a, 6a off.

Next, a third check is performed to detect a failure in the path from the connecting point 13, through the fourth semiconductor switching element 6 and the second semiconductor switching element 4, to the negative terminal side of the battery 1.

In this case, the MOSFET 4a of the second semiconductor switching element 4 and the MOSFET 6a of the fourth semiconductor switching element 6 are turned on, and the other MOSFETs 3a, 5a are turned off. Also at this time, because the MOSFETs 3a, 5a are turned off, the power supply line from the battery 1 to the motor 2 is in a cut off state, so the motor 2 is not being driven. If everything is normal, the monitor voltage will become the Lo level voltage, but if a disconnection has occurred in the path described above, such as a disconnection of one of the MOSFETs 4a, 6a or the like, the monitor voltage will become the M level voltage. Therefore, this operation makes it possible to check that the MOSFETs 4a, 6a are not disconnected.

Last, a fourth check is performed to detect a failure in the path from the connecting point 13, through the third semiconductor switching element 5 and the second semiconductor switching element 4, to the negative terminal side of the battery 1.

In this case, the MOSFET 4a of the second semiconductor switching element 4 and the MOSFET 5a of the third semiconductor switching element 5 are turned on, and the other MOSFETs 3a, 6a are turned off. Also at this time, because the MOSFETs 3a, 6a are turned off, the power supply line from the battery 1 to the motor 2 is in a cut off state, so the motor 2 is not being driven. If everything is normal, the monitor voltage will become the Lo level voltage, but if a disconnection has occurred in the path described above, such as a disconnection of one of the MOSFETs 4a, 5a or the like, the monitor voltage will become the M level voltage. Therefore, this operation makes it possible to check that the MOSFETs 4a, 5a are not disconnected.

The checks described above make it possible to check that the parasitic diode 6b that functions as the freewheeling diode is properly connected electrically, thus making it possible to perform the failure detection for the return current circuit. It also becomes possible to check that not only the parasitic diode 6b but also the MOSFETs 3a to 5a of the first to the third semiconductor switching elements 3 to 5 are properly connected electrically. Furthermore, it is possible to perform these checks without driving the motor 2.

Second Embodiment

A second embodiment of the present invention will be explained. In the present embodiment, the connection configuration in the motor drive circuit is different from that in the first embodiment, but in all other respects, the present embodiment is the same as the first embodiment, so only the portions that are different will be explained.

Figure 3:
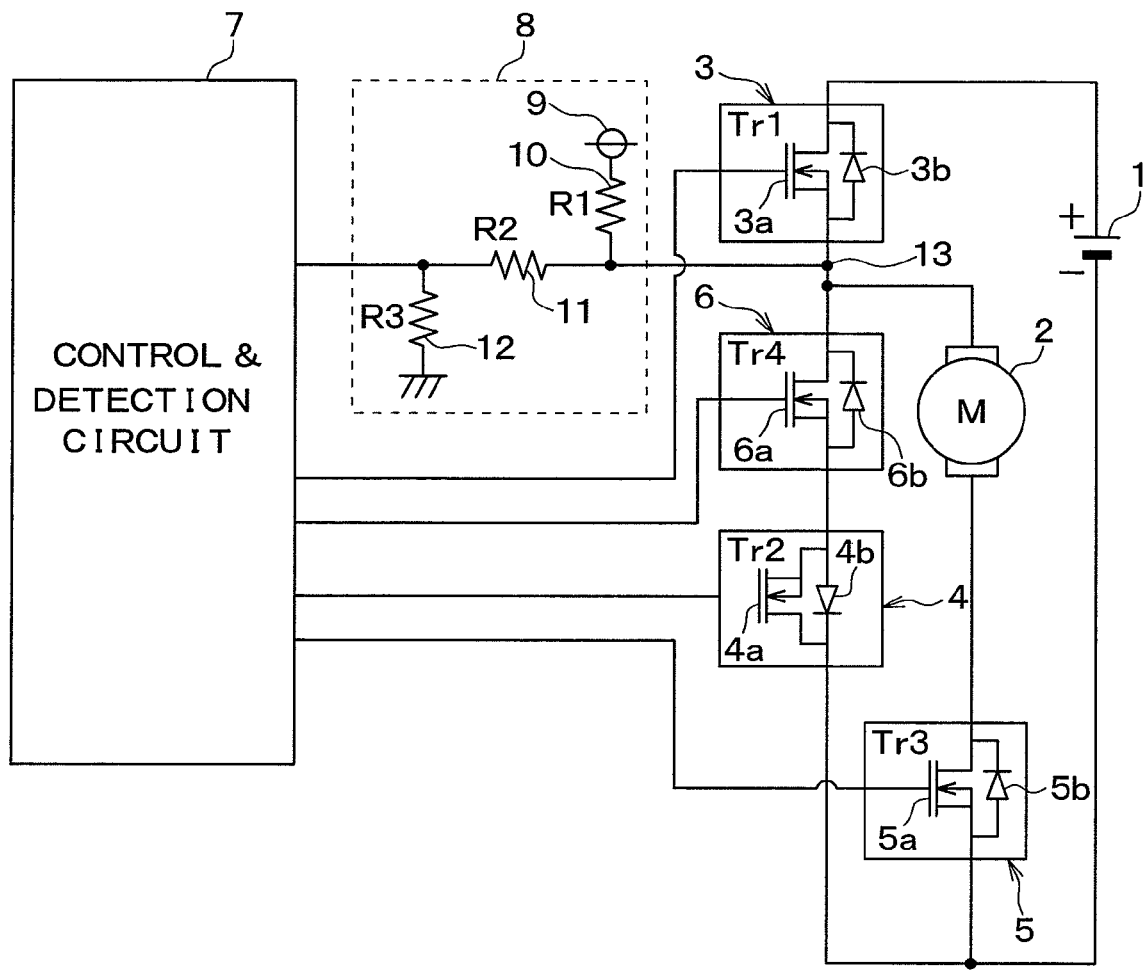
FIG. 3 is a figure that shows a circuit configuration of a motor drive circuit according to a second embodiment of the present invention.

FIG. 3 is a figure that shows a circuit configuration of the motor drive circuit according to the present embodiment. As shown in this figure, the motor drive circuit in the present embodiment is not configured as it is in the first embodiment, with the third semiconductor switching element 5 connected to the negative terminal side of the battery 1 through the second semiconductor switching element 4, but rather is configured such that the third semiconductor switching element 5 is connected directly to the negative terminal side of the battery 1. In other words, the motor drive circuit is configured such that the second semiconductor switching element 4 is located within the return current circuit.

In this sort of configuration, each of the semiconductor switching elements 3 to 6 functions in basically the same manner as in the first embodiment. However, in the first embodiment, when the electric power is being supplied to the motor 2, the power passes through the second semiconductor switching element 4, so it is necessary to design the second semiconductor switching element 4 such that it can handle the commensurately large loss power, but in the configuration of the present embodiment, only the return current flows through the second semiconductor switching element 4. The return current is dramatically smaller than the electric current that is supplied to the motor 2, and the second semiconductor switching element 4 needs to be designed to handle only the return current, so it is possible to make it more compact and to reduce its cost.

Next, the failure detection method in the motor drive circuit that is configured in this manner will be explained. Note that the method of driving the motor 2 during normal operation is the same as in the first embodiment, so the explanation of that method will be omitted.

FIG. 4 is a table that shows a table of truth values that indicate the on and off states of the MOSFETs 3a to 6 in the first to the fourth semiconductor switching elements 3 to 6, the relationships between the monitor voltage and the voltage during a failure, and the drive state of the motor 2, which correspond to various types of items that are checked during the failure detection.

First, an operation is performed as a first check in the same manner as in the first embodiment. In other words, the MOSFETs 3a to 6a are all turned off, and each element is checked to see if it is locked on. Then, if the monitor voltage becomes other than the M level voltage, that is, one of the Hi level voltage and the Lo level voltage, the control and detection circuit 7 detects that a locked on state has occurred.

Next, as a second check, in the same manner as in the first embodiment, the MOSFET 3a of the first semiconductor switching element 3 is turned on, and the other MOSFETs 4a to 6a are turned off in order to detect a failure in the path from the positive terminal side of the battery 1, through the first semiconductor switching element 3, to the connecting point 13. At this time, the failure states of the various portions and the voltage levels of the monitor voltage are the same as in the first embodiment.

Next, as a third check, in the same manner as in the first embodiment, the MOSFET 4a of the second semiconductor switching element 4 and the MOSFET 6a of the fourth semiconductor switching element 6 are turned on, and the other MOSFETs 3a, 5a are turned off. This is done in order to detect a failure in the path from the connecting point 13, through the fourth semiconductor switching element 6 and the second semiconductor switching element 4, to the negative terminal side of the battery 1. In this process, the failure states of the various portions and the voltage levels of the monitor voltage are the same as in the first embodiment.

Last, a fourth check is performed to detect a failure in the path from the connecting point 13, through the motor 2 and the third semiconductor switching element 5, to the negative terminal side of the battery 1. In this case, unlike in the first embodiment, the MOSFET 5a of the third semiconductor switching element 5 is turned on, and the other MOSFETs 3a, 4a, 6a are turned off. At this time, because the MOSFETs 3a, 4a, 6a are turned off, the power supply line from the battery 1 to the motor 2 is in a cut off state, so the motor 2 is not being driven. If everything is normal, the monitor voltage will become the Lo level voltage, but if a disconnection has occurred in the path described above, such as a disconnection of one of the MOSFET 5a or the like, the monitor voltage will become the M level voltage. Therefore, this operation makes it possible to check that the MOSFET 5a is turned on and functioning properly.

Thus, even though the connection configuration in the motor drive circuit is different from that in the first embodiment, it is possible to check that the parasitic diode 6b that functions as the freewheeling diode is properly connected electrically, thus making it possible to perform the failure detection for the return current circuit. It also becomes possible to check that not only the parasitic diode 6b but also the MOSFETs 3a to 5a of the first to the third semiconductor switching elements 3 to 5 are properly connected electrically. Furthermore, it is possible to perform these checks without driving the motor 2.

Note that in the case of this sort of circuit configuration, the MOSFET 4a of the second semiconductor switching element 4 is not connected in series to the motor 2, so if the battery 1 is connected in reverse, electric power will be supplied to the motor 2, and the motor 2 will turn. It is therefore necessary to have a system that can permit the motor 2 to turn when the battery 1 is connected in reverse. For example, if the electric current that flows to the motor 2 is large, large amounts of heat will be generated by the parasitic diode 5b of the third semiconductor switching element 5 and the parasitic diode 3b of the first semiconductor switching element 3, possibly creating a problem that the elements will be destroyed, but this sort of problem will not occur if the electric current that flows to the motor 2 is small, so as long as the system is such that the electric current that flows to the motor 2 is small, even when the battery 1 is connected in reverse, no problem will occur.

Third Embodiment

A third embodiment of the present invention will be explained. In the present embodiment, the connection configuration in the motor drive circuit is different from that in the first embodiment, but in all other respects, the present embodiment is the same as the first embodiment, so only the portions that are different will be explained.

Figure 5:
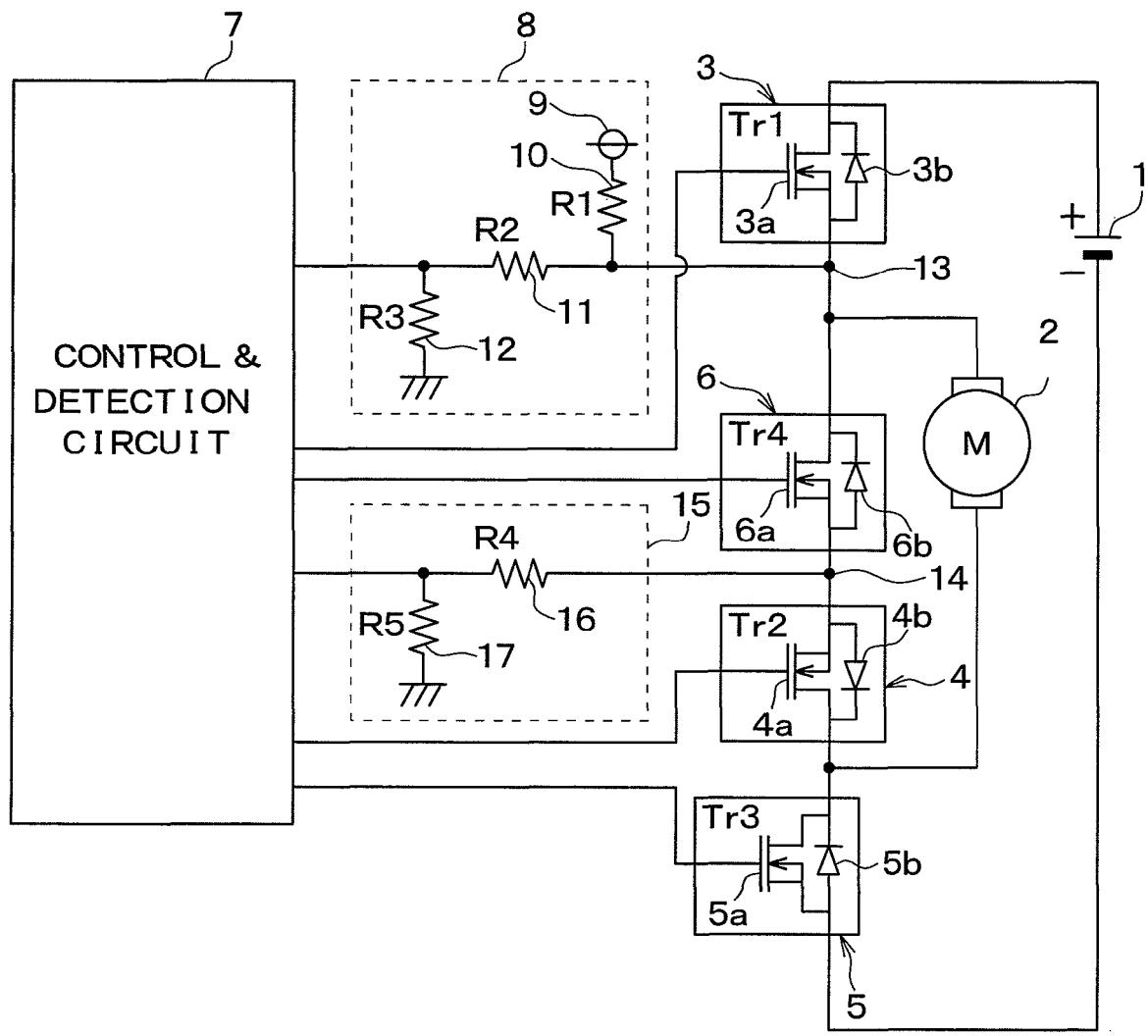
FIG. 5 is a figure that shows a circuit configuration of a motor drive circuit according to a third embodiment of the present invention.

FIG. 5 is a figure that shows a circuit configuration of the motor drive circuit according to the present embodiment. As shown in this figure, the motor drive circuit in the present embodiment is configured such that the second semiconductor switching element 4 is located within the return current circuit, and while the third semiconductor switching element 5 is located outside the return current circuit, it is located on the downstream side of the second semiconductor switching element 4.

In this sort of configuration, each of the semiconductor switching elements 3 to 6 functions in basically the same manner as in the first embodiment. However, in the first embodiment, only the potential of the connecting point 13 is used as the monitor voltage, but in the present embodiment, the potential of the connecting point 13 is used as a first monitor voltage, and a potential of a connecting point 14 that connects the second semiconductor switching element 4 and the fourth semiconductor switching element 6 is used as a second monitor voltage. Specifically, the motor drive circuit is provided with a monitor circuit (a second monitor circuit) 15. The monitor circuit 15 is configured such that it includes fourth and fifth resistors 16, 17 that have resistance values that are much greater than the resistance of the motor 2, and it monitors the second monitor voltage by using the fourth and the fifth resistors 16, 17 to divide the potential of the connecting point 14 and input it to the control and detection circuit 7.

Next, the failure detection method in the motor drive circuit that is configured in this manner will be explained. Note that the method of driving the motor 2 during normal operation is the same as in the first embodiment, so the explanation of that method will be omitted.

FIG. 6 is a table that shows a table of truth values that indicate the on and off states of the MOSFETs 3a to 6a, relationships between the first and the second monitor voltages and the voltage during a failure, and the drive state of the motor 2, which correspond to various types of items that are checked during the failure detection.

In FIG. 6, M1 to M3 are first to third medium voltages that are divided by the first to the fifth resistors 10 to 12, 16, 17 and the resistance of the motor 2, resistance values R1 to R5 respectively indicate the resistances of the first to the fifth resistors 10 to 12, 16, 17, and rm indicates the resistance value for the motor 2.

Specifically, the first medium voltage M1 is the value when the voltage of the constant-voltage source 9 is divided by the first to the third resistors 10 to 12 (the constant voltage (5 V)×R3/(R1+R2+R3)). The second medium voltage M2 is the value when the voltage of the constant-voltage source 9 is divided by the first to the fifth resistors 10 to 12, 16, 17 (the constant voltage (5 V)×R3/{R1+(R2+R3)//(R4+R5)})×(R4+R5)/(R2+R3+R4+R5). The expression (R2+R3)//(R4+R5) indicates the combined resistance value when R4 and R5, which are connected in series, are connected in parallel to R2 and R3, which are connected in series. The third medium voltage M3 is the value when the voltage of the constant-voltage source 9 is divided by the first to the fifth resistors 10 to 12, 16, 17 and the resistance of the motor 2 (the constant voltage (5 V)×R3/{R1+(R2+R3)//(rm+R4+R5)})×(rm+R4+R5)/(rm+R2+R3+R4+R5). The expression (R2+R3)//(rm+R4+R5) indicates the combined resistance value when rm, R4, and R5, which are connected in series, are connected in parallel to R2 and R3, which are connected in series.

However, rm can be ignored, because it is much smaller than R1 to R5, so the resistance values can be set such that R2 equals R4 and R3 equals R5. The relationships among the first to the third medium voltages M1 to M3 can therefore be expressed as M1 is greater than M2, M1 is greater than M3, and M2 is approximately equal to M3.

First, the same sort of operation as is performed in the first embodiment is performed as a first check. In other words, the MOSFETs 3a to 6a are all turned off, and each element is checked to see if it is locked on.

If everything is normal at this time, the first monitor voltage will become the first medium voltage M1, and the second monitor voltage will become the Lo level voltage, so if the second monitor voltage is other than the desired voltage level, the control and detection circuit 7 detects that a locked on state has occurred.

Next, as a second check, in the same manner as in the first embodiment, the MOSFET 3a of the first semiconductor switching element 3 is turned on, and the other MOSFETs 4a to 6a are turned off in order to detect a failure in the path from the positive terminal side of the battery 1, through the first semiconductor switching element 3, to the connecting point 13.

If everything is normal at this time, the first monitor voltage will become the Hi level voltage, and the second monitor voltage will become the Lo level voltage. In contrast, if a disconnection has occurred in the path described above, such as a disconnection of the MOSFET 3a or the like, the first monitor voltage will remain at the first medium voltage M1. Therefore, this operation makes it possible to check that the MOSFET 3a is turned on and functioning properly.

Next, a third check is performed to detect a failure in the path from the connecting point 13, through the fourth semiconductor switching element 6, to the connecting point 14. Specifically, the MOSFET 6a of the fourth semiconductor switching element 6 is turned on, and the other MOSFETs 3a to 5a are turned off.

If everything is normal at this time, the first and the second monitor voltage will both become the second medium voltage M2. In contrast, if a disconnection has occurred in the path described above, such as a disconnection of the MOSFET 6a of the fourth semiconductor switching element 6 or the like, the first monitor voltage will change to the first medium voltage M1, and the second monitor voltage will remain at the Lo level voltage. Therefore, this operation makes it possible to check that the MOSFET 6a is turned on and functioning properly.

Next, a fourth check is performed to detect a failure in the path from the connecting point 13, through the motor 2 and the second semiconductor switching element 4, to the connecting point 14. Specifically, the MOSFET 4a of the second semiconductor switching element 4 is turned on, and the other MOSFETs 3a, 5a, and 6a are turned off.

If everything is normal at this time, the first and the second monitor voltage will both become the third medium voltage M3. In contrast, if a disconnection has occurred in the path described above, such as a disconnection of the MOSFET 4a of the second semiconductor switching element 4 or the like, the first monitor voltage will remain at the first medium voltage M1, and the second monitor voltage will remain at the Lo level voltage. Therefore, this operation makes it possible to check that the MOSFET 4a is turned on and functioning properly.

Last, a fifth check is performed to detect a failure in the path from the connecting point 13, through the motor 2 and the third semiconductor switching element 5, to the negative terminal of the battery 1. Specifically, the MOSFET 5a of the third semiconductor switching element 5 is turned on, and the other MOSFETs 3a, 4a, and 6a are turned off.

If everything is normal at this time, the first and the second monitor voltage will both become the Lo level voltage. In contrast, if a disconnection has occurred in the path described above, such as a disconnection of the MOSFET 5a of the third semiconductor switching element 5 or the like, the first monitor voltage will change to the first medium voltage M1. Therefore, this operation makes it possible to check that the MOSFET 5a is turned on and functioning properly.

Thus, even though the connection configuration in the motor drive circuit is different from that in the first embodiment, it is possible to check that the parasitic diode 6b that functions as the freewheeling diode is properly connected electrically, thus making it possible to perform the failure detection for the return current circuit. It also becomes possible to check that not only the parasitic diode 6b but also the MOSFETs 3a to 5a of the first to the third semiconductor switching elements 3 to 5 are functioning properly. Furthermore, it is possible to perform these checks without driving the motor 2.

Fourth Embodiment

A fourth embodiment of the present invention will be explained. In the present embodiment, a motor drive circuit that performs drive control of the motor 2 based on the result of the failure detection in the first embodiment will be explained. The circuit configuration of the motor drive circuit in the present embodiment is substantially the same as the circuit configuration of the motor drive circuit according to the first embodiment. Accordingly, the reference numerals that are used for the various configuring elements of the motor drive circuit according to the present embodiment are the same as those that are used for the corresponding elements in the motor drive circuit according to the first embodiment, and a detailed explanation of the circuit configuration of the motor drive circuit will be omitted. However, in the present embodiment, it is assumed that a clamp circuit is provided between the source and the drain of the first semiconductor switching element 3.

In the motor drive circuit according to the present embodiment, (1) in a case where it has been detected that all of the first to the fourth semiconductor switching elements 3 to 6 are normal, an on duty of a drive signal for the motor 2 is set to a normal duty, and the motor 2 is driven at the normal duty by PWM, and (2) in a case where it has been detected that any one of the first to the third semiconductor switching elements 3 to 5 has failed, the PWM drive for the motor 2 is stopped. In particular, (3) in a case where it has been detected that all of the first to the third semiconductor switching elements 3 to 5 are normal, and that the fourth semiconductor switching element 6 has been disconnected, the on duty of the drive signal for the motor 2 is set to a fail-safe duty that is greater than the normal duty, and the motor 2 is driven at the fail-safe duty by PWM. The fail-safe duty is a duty value that is set according to the surge resistance of the first semiconductor switching element 3. Driving the motor 2 at the fail-safe duty by PWM in this manner makes it possible to continue operating the motor 2 when a disconnection of the fourth semiconductor switching element 6 occurs, while also inhibiting the occurrence of a secondary failure of the first semiconductor switching element 3 that is caused by the disconnection.

This point will be explained further with reference to FIG. 7. FIG. 7 is a figure that shows a mode of operation of the motor drive circuit. In FIG. 7, (a) shows the on and off states of the first semiconductor switching element 3, (b) shows a drive current Im of the motor 2, and (c) shows the potential Vc of the connecting point 13 between the first semiconductor switching element 3 and the motor 2. Further, in FIG. 7, the broken line graph in (c) indicates the potential Vc when the fourth semiconductor switching element 6 is in a normal state, while the solid line graph indicates the potential Vc when the fourth semiconductor switching element 6 is in a disconnected state.

As shown in FIG. 7, at time t1, when the first semiconductor switching element 3 turns on and electric power starts to be supplied to the motor 2, the drive current Im increases. At time t2, when the motor 2 starts operating, the drive current Im becomes roughly constant and remains so thereafter. At time t3, when the first semiconductor switching element 3 turns off, a surge that is caused by the back electromotive force is imposed on the connecting point 13, so the potential Vc of the connecting point 13 drops.

In a case where there is no failure in the fourth semiconductor switching element 6, the surge energy is consumed by a return current operation. Therefore, as shown by the broken line graph in (c) in FIG. 7, the drop in the potential Vc of the connecting point 13 that occurs when the first semiconductor switching element 3 turns off is reduced.

On the other hand, in a case where the fourth semiconductor switching element 6 is disconnected, the surge energy is not consumed by the return current circuit, so the surge energy is consumed by the flowing of electric current from the battery 1, through the first semiconductor switching element 3, to the connecting point 13. Therefore, as shown by the solid line graph in (c) in FIG. 7, the potential Vc of the connecting point 13 drops to V1, which is lower than the potential VB of the positive terminal of the battery 1 by an amount that is equal to a clamp voltage Vcl in the first semiconductor switching element 3.

Incidentally, in a case where the fourth semiconductor switching element 6 is disconnected, if the surge that is imposed on the connecting point 13 becomes too great, the clamp voltage of the first semiconductor switching element 3 is applied, and as a result, the first semiconductor switching element 3 may fail.

This issue is addressed in the present invention by reducing the drive current Im when the first semiconductor switching element 3 turns off in a case where it is detected that the fourth semiconductor switching element 6 is disconnected.

Figure 8:
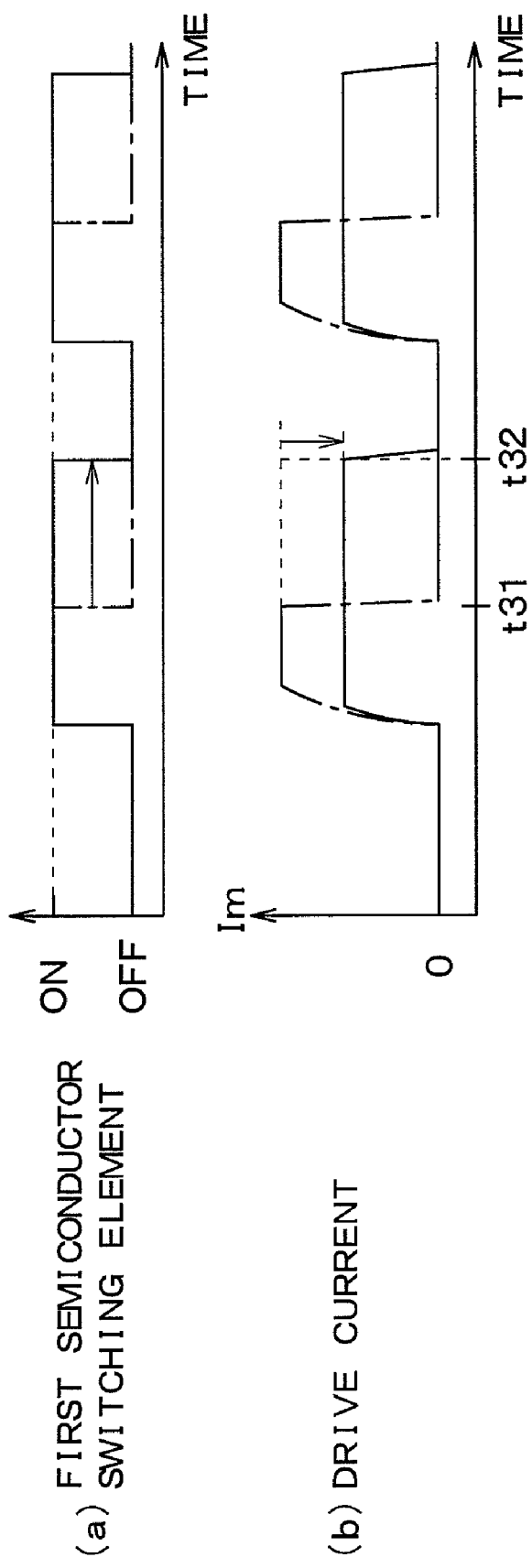
FIG. 8 is a figure that shows a relationship between on and off states of a first semiconductor switching element and a drive current Im of the motor.

FIG. 8 is a figure that shows a relationship between the on and off states of the first semiconductor switching element 3 and the drive current Im of the motor 2, in the same manner as in FIG. 7. As shown in FIG. 8, if the on duty of the motor drive signal is increased, the magnitude of the motor drive current Im diminishes according to the revolution speed of the motor 2 (the magnitude of electric power generation by the motor 2) (refer to times t31 and t32 in (b) in FIG. 8). Accordingly, in a case where it is detected that the fourth semiconductor switching element 6 is disconnected, the on duty of the motor drive signal is set to the fail-safe duty, which is greater than the normal duty, and the motor 2 is driven at the fail-safe duty by PWM.

Reducing the drive current Im in this manner when the first semiconductor switching element 3 turns off reduces the surge energy that is imposed on the connecting point 13. This makes it possible to continue operating the motor 2 when a disconnection of the fourth semiconductor switching element 6 occurs, while also inhibiting the occurrence of a secondary failure of the first semiconductor switching element 3 that is caused by the disconnection.

Figure 9:
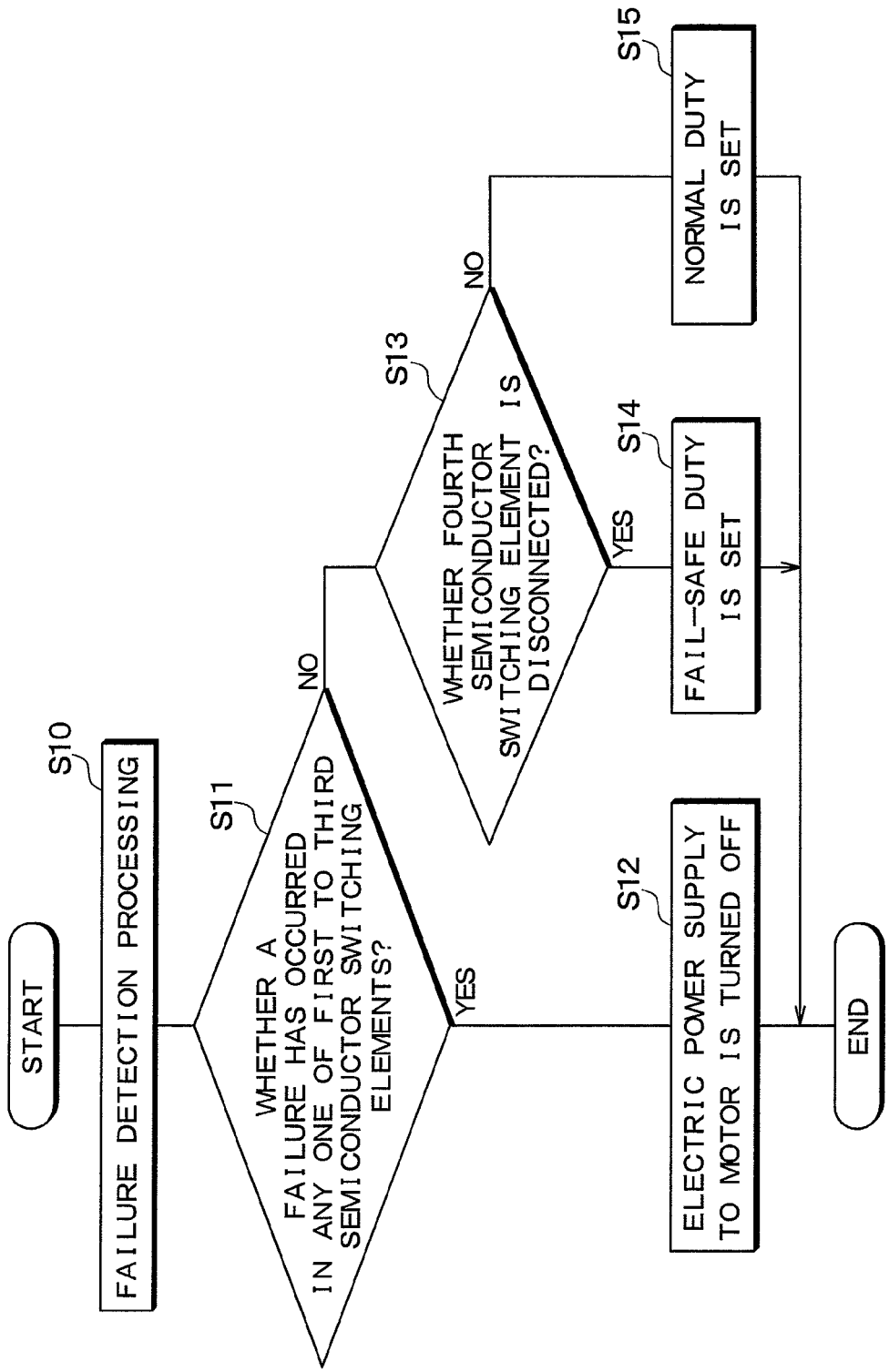
FIG. 9 is a flowchart that shows a flow of a program for controlling driving of the motor.

FIG. 9 is a flowchart that shows a flow of a program for controlling the driving of the motor 2 as described above. In the present embodiment, it is assumed that the program is executed cyclically by the control and detection circuit 7.

At Step 10 that is shown in FIG. 9, the control and detection circuit 7 detects failures in each of the first to the fourth semiconductor switching elements 3 to 6 in the same manner as in the first embodiment.

Next, at Step 11, the control and detection circuit 7 determines whether or not a failure such as a disconnection, a short circuit, or the like has occurred in any one of the first to the third semiconductor switching elements 3 to 5. In a case where it has been determined that a failure has occurred in any one of the first to the third semiconductor switching elements 3 to 5, at Step 12 the control and detection circuit 7 stops the electric power supply to the motor 2 by turning off the first and the second semiconductor switching elements 3 and 4, then ends the execution of the program. On the other hand, in a case where it has been determined that no failure has occurred in any one of the first to the third semiconductor switching elements 3 to 5, the processing proceeds to Step 13.

At Step 13, the control and detection circuit 7 determines whether or not the fourth semiconductor switching element 6 is disconnected. In a case where it has been determined that the fourth semiconductor switching element 6 is disconnected, at Step 14 the control and detection circuit 7 sets the on duty of the motor drive signal to the fail-safe duty, then ends the execution of the program. On the other hand, in a case where it has been determined that the fourth semiconductor switching element 6 is not disconnected, at Step 15 the control and detection circuit 7 sets the on duty of the motor drive signal to the normal duty, then ends the execution of the program.

According to the drive control of the motor 2 that is explained above, in a case where no failure has occurred in any one of the first to the third semiconductor switching elements 3 to 5, the on duty of the motor drive signal is set to the fail-safe duty, and the motor 2 continues to be operated by PWM at the fail-safe duty, even in a case where the fourth semiconductor switching element 6 is disconnected. In other words, in the motor drive circuit, in a case where no failure has occurred in the electric power supply circuit, the on duty of the motor drive signal is increased, and the motor 2 continues to be operated, even if there is a failure in the return current circuit. This makes it possible to continue operating the motor 2 when a disconnection of the fourth semiconductor switching element 6 occurs, while also inhibiting the occurrence of a failure of the first semiconductor switching element 3 that is caused by the disconnection, that is, while also inhibiting the occurrence of a secondary failure of the electric power supply circuit that is caused by the occurrence of the failure in the return current circuit.

Other Embodiments

In each of the embodiments described above, an example of a check method for detecting a failure in each portion is shown, but any check method may be used, provided that each of the MOSFETs 3a to 6a is in both the on and off states during the check, and that the circuit is configured in such a way that the freewheeling diode is configured in the form of the fourth semiconductor switching element 6 and it is possible to use the MOSFET 6a of the fourth semiconductor switching element 6 to check whether or not the return current circuit is functioning.

In the embodiments described above, the freewheeling diode is given as an example of the return current element, but not only a diode, but also a simple switch element or the like may be used as the return current element. In other words, the circuit may be configured such that, when the motor 2 is being driven by PWM, the switch element is turned on and off as the MOSFET 3a of the first semiconductor switching element 3 is turned on and off.

Further, the fail-safe duty in the fourth embodiment may also be 100% of the on duty. That is, when a failure occurs in the return current circuit, the motor 2 may continue to be operated by putting the motor 2 into a fully on state. In that case, the surge is not generated when the first semiconductor switching element 3 turns off while the motor 2 is in operation. This makes it possible to continue operating the motor 2 while also preventing the occurrence of a secondary failure of the first semiconductor switching element 3.

In the fourth embodiment that is described above, the on duty of the motor drive signal is increased when a failure occurs in the return current circuit. However, the fourth embodiment is not limited to this example. It is sufficient for the time period when the motor 2 is on (refer to times t1 to t3 in FIG. 7) to be made longer than the normal time when no failure occurs in the return current circuit, and the increasing of the on duty of the motor drive signal, as described above, is one form of this. It is therefore conceivable, for example, for the pulse width of the motor drive signal to be increased, and for the pulse cycle to be lengthened accordingly. In that case, it is possible to reduce the change in the on duty of the motor drive signal, both during normal operation and when a failure occurs.

The fourth embodiment that is described above can also be applied to the motor drive circuits in the second and third embodiments that are described above. Specifically, in a case where the motor drive control of the fourth embodiment is applied to one of the second embodiment and the third embodiment, when there is no failure in the first semiconductor switching element 3 and the third semiconductor switching element 5, but one of the second semiconductor switching element 4 and the fourth semiconductor switching element 6 is disconnected, the on duty of the motor drive signal is increased.

In the fourth embodiment that is described above, the operating state of the motor 2 is switched based on the result of the failure detection for the motor drive circuit. However, the fourth embodiment is not limited to this example, and it is conceivable that the operation of the motor 2 would be prohibited in a case where a failure has occurred in the return current circuit. In that case, it would be possible to prevent the occurrence of a secondary failure of the first semiconductor switching element 3 that is caused by the occurrence of a disconnection in the fourth semiconductor switching element 6.

What is claimed is:

1. A motor drive circuit, comprising:
   a first semiconductor switching element for use in motor control, that by being located on a high side of a motor that is driven based on an electric power supply from an electric power source, controls on and off states of the electric power supply and that includes a diode that is connected in a reverse direction and whose cathode faces toward the high side;
   a second semiconductor switching element that is located on a low side of the first semiconductor switching element and that includes a diode that is connected in a forward direction and whose anode faces toward the high side;
   a third semiconductor switching element for use as a fail-safe element, that is located on a low side of the motor, that turns off the electric power supply when a failure occurs in the first semiconductor switching element, and that includes a diode that is connected in a reverse direction and whose cathode faces toward the high side;
   a fourth semiconductor switching element that is connected in parallel to the motor and configures a return current circuit that includes a return current element and that causes a return current that is generated when the first semiconductor switching element is turned off to flow through the return current element; and
   a control portion that controls on and off states of the first to the fourth semiconductor switching elements, that uses an electric potential of a connecting point between the first semiconductor switching element and the motor as a first monitor voltage, that inputs a voltage that corresponds to the first monitor voltage, and that performs failure detection, based on the first monitor voltage, that checks whether the return current circuit is functioning properly.

2. The motor drive circuit according to claim 1,
wherein the second semiconductor switching element is located on a low side of the third semiconductor switching element.

3. The motor drive circuit according to claim 1,
wherein the fourth semiconductor switching element is connected in parallel to the third semiconductor switching element and the motor, which are connected in series.

4. The motor drive circuit according to claim 3,
wherein the motor and the third semiconductor switching element, which are connected in series, are connected in parallel to the second semiconductor switching element and the fourth semiconductor switching element, which are connected in series.

5. The motor drive circuit according to claim 3,
wherein the first to the fourth semiconductor switching elements are all connected in series, the order starting from the high side being the first semiconductor switching element, the fourth semiconductor switching element, the second semiconductor switching element, and the third semiconductor switching element, an electric potential of a connecting point between the fourth semiconductor switching element and the second semiconductor switching element is used as a second monitor voltage, a voltage that corresponds to the second monitor voltage is input to the control portion, and the control portion performs failure detection, based on the first monitor voltage and the second monitor voltage, that checks whether the return current circuit is functioning properly.

* * * * *